United States Patent [19]
Steiner et al.

[11] Patent Number: 4,502,912
[45] Date of Patent: Mar. 5, 1985

[54] APPARATUS FOR MAKING GLUE STRIPS ON A RAPIDLY MOVING WEB

[75] Inventors: Erich Steiner, Brannenburg; Theo Hesselmann, Post Vogtareuth, both of Fed. Rep. of Germany

[73] Assignee: Planatolwerk Willy Hesselmann, Chemische Und Maschinenfabrik Für Klebetechnik GmbH & Co. KG, Rohrdorf-Thansau, Fed. Rep. of Germany

[21] Appl. No.: 503,315

[22] Filed: Jun. 10, 1983

[30] Foreign Application Priority Data

Jun. 14, 1982 [DE] Fed. Rep. of Germany ....... 3222335

[51] Int. Cl.$^{3}$ .......................... B32B 31/08; B05C 5/02
[52] U.S. Cl. .................................... 156/548; 118/411; 156/549; 156/555; 156/578
[58] Field of Search ................. 118/406, 410, 417, 25, 118/412; 156/575, 436, 548, 549, 555, 578

[56] References Cited

U.S. PATENT DOCUMENTS 3,332,580 7/1967 Spencer et al. ................. 118/411 X

FOREIGN PATENT DOCUMENTS 1037251 8/1958 Fed. Rep. of Germany ...... 118/411
2305889 6/1980 Fed. Rep. of Germany .

*Primary Examiner*—John P. McIntosh
*Attorney, Agent, or Firm*—Karl F. Ross; Herbert Dubno

[57] ABSTRACT

An apparatus for forming a succession of equispaced and transversely extending glue strips on a longitudinally extending web has an applicator drum rotatable about a drum axis and having a cylindrical outer surface with a circumference equal to a whole-number multiple of the desired distance between succeeding strips. The drum is formed with at least one axially extending manifold passage and an axially extending row of bores opening radially outward at the drum surface and inward into the passage. Guide and transport rollers displace the web longitudinally at very high speed past the applicator drum with the web looped over same and engaging same over an angularly extending contact region. A drive rotates the drum about the axis at a peripheral speed substantially equal to the very high displacement speed of the web. A stationary supply of liquid glue suitable for forming the strips is connected by a conduit with the manifold passage for conducting the glue from the supply to the bores and then to the surface of the drum along the row of bores. Thus the glue emerging from the bores is applied as a strip to the passing web.

20 Claims, 9 Drawing Figures

APPARATUS FOR MAKING GLUE STRIPS ON A RAPIDLY MOVING WEB

FIELD OF THE INVENTION

The present invention relates to an apparatus for making liquid or glue strips on a moving web. More particularly this invention concerns such an apparatus used for preparing signatures or pamphlets in a bindery or publishing establishment.

BACKGROUND OF THE INVENTION

In the formation of signatures for bookbinding, or in the making of pamphlets or magazines it is necessary to provide one web or sheet with a glue strip so it can be adhered to another web or sheet and then folded along this strip. Such a machine as described in German Pat. No. 1,115,120 has a glue-applying roll that tangentially engages a moving web to form glue strips on it.

Typically the glue strips must be formed longitudinally of the web when same is moving at any significant speed, as the machine cannot form anything resembling a neat strip when working at high speed (see the report "Rationalisierung by der Fertigstellung von Druckprodukten", 3/82 of Industrie Verlag). Longitudinal glue strips are not practical for modern binding techniques however.

Any attempt to use such devices in high-speed modern binding systems, where the workpiece travels at 300 m/min to 500 m/min, have been wholly futile. The roll must rotate at such high speed that it spews glue in all directions, and forms a very sloppy glue strip on the web. Furthermore when run at such high speed the likelihood of blockage of the glue passages increases.

OBJECTS OF THE INVENTION

It is therefore an object of the present invention to provide an improved glue-stripping apparatus.

Another object is the provision of such a glue-striping apparatus which overcomes the above-given disadvantages, that is which can apply a neat transverse glue strip to a web moving at very high speed.

SUMMARY OF THE INVENTION

These objects are attained according to the instant invention in an apparatus for forming a succession of equispaced and transversely extending glue strips on a longitudinally extending web which has an applicator drum rotatable about a drum axis and having a cylindrical outer surface with a circumference equal to a whole-number multiple of the desired distance between succeeding strips. The drum is formed with at least one axially extending manifold passage and an axially extending row of bores opening radially outward at the drum surface and inward into the passage. Guide and transport rollers displace the web longitudinally at very high speed past the applicator drum with the web looped over and engaging same over an angularly extending contact region. A drive rotates the drum about the axis at a peripheral speed substantially equal to the very high displacement speed of the web. A stationary supply of liquid glue suitable for forming the strips is connected by a conduit with the manifold passage for conducting the glue from the supply to the bores and thence to the surface of the drum along the row of bores. Thus the glue emerging from the bores is applied as a strip to the passing web.

With this system it is therefore possible to operate at very high speed—300 to 500 m/min—while still forming very neat glue strips on the web. The bores do not clog in the system of this invention, so the system allows automation to be applied to this type of binding system.

According to this invention the bores are of such a flow cross section, relative to the rotation speed of the drum and viscosity of the glue, that they substantially counteract the radially outwardly directed force effective on the glue in the bores and passage due to drum rotation. This can be achieved when each bore has a radially outer portion of a length of about 1 mm and a diameter of about 0.8 mm and an inner portion of a length of about between 2 mm and 4 mm and a diameter of about 0.3 mm. Such capillary action effectively eliminates the effects of centrifugal force.

The system according to this invention can further have valve means including a valve body at the inner ends of the bores displaceable between an open position permitting flow into and along the bores and a closed position preventing such flow. The valve body extends axially in the passage and is movable therein about a valve axis offset from the drum axis. It fits with radial play relative to the valve axis in the passage and is provided with a resilient seal ridge overlying the inner bore ends in the closed position and spaced therefrom in the open position. Normally the drum is provided with a removable insert forming the manifold passage and bores and housing the valve body. Such an insert greatly eases servicing of the equipment, and allows it to be used with different glues relatively easily.

The valve means also has actuation means for displacing the valve body between its open and closed positions synchronously with each revolution of the drum about the drum axis a number of times equal to the number of rows of bores on the drum. This means can include a stationary cam adjacent the drum and a cam follower carried on the drum, connected to the valve body, and engaging the cam. Alternately it can be formed by a stationary gear adjacent the drum and a gear train meshing with the gear and connected to the cam for rotation of the valve body synchronously with the drum. Either way the invention provides means for varying the angle through which the actuation means displaces the valve body so that flow control is achieved. In addition the valve axis is displaceable relative to the bores for adjustment of the clearance between the valve body and the inner bore ends.

According to the instant invention the guide means passes the web over the drum relative to the drum axis through a contact arc of at least 90°. In this manner the valve can be opened to dose the bores with glue when their outer ends are covered, so spraying of glue by the drum is wholly impossible. Instead the only times the bores are supplied with glue they are covered by the web, and they remain covered long enough to transfer all the excess glue to the web so when same pulls out of engagement with the drum there is not enough glue left in the outer portions of the bores to spray outward.

The system of this invention also can have means connected to the conduit means and responsive to drum rotation rate for metering the glue to the bores. Such means can include a valve in the drum between the conduit means and the passage or even a throttle. Means may also be provided for subjecting the passage to a pressure other than ambient.

An apparatus without a valve can be provided with cover means engageable with the outer ends of the bores to seal same in a position offset from the region of contact between the web and the drum surface. Such a cover would also of course be usable on a valve-equipped system, but would be less essential.

The gluing apparatus according to this invention also has second guide and drive means for feeding a second web separate from the first-mentioned web at the very high speed past the drum to a uniting location downstream of the drum and a pair of pinch rolls at the uniting location rotating at the same peripheral speed as the drum and gripping the two webs. Thus the webs are glued together along lines defined by the glue strips.

DESCRIPTION OF THE DRAWING

The above and other features and advantages will become more readily apparent from the following, reference being made to the accompanying drawing in which.

SPECIFIC DESCRIPTION

Figure 1:
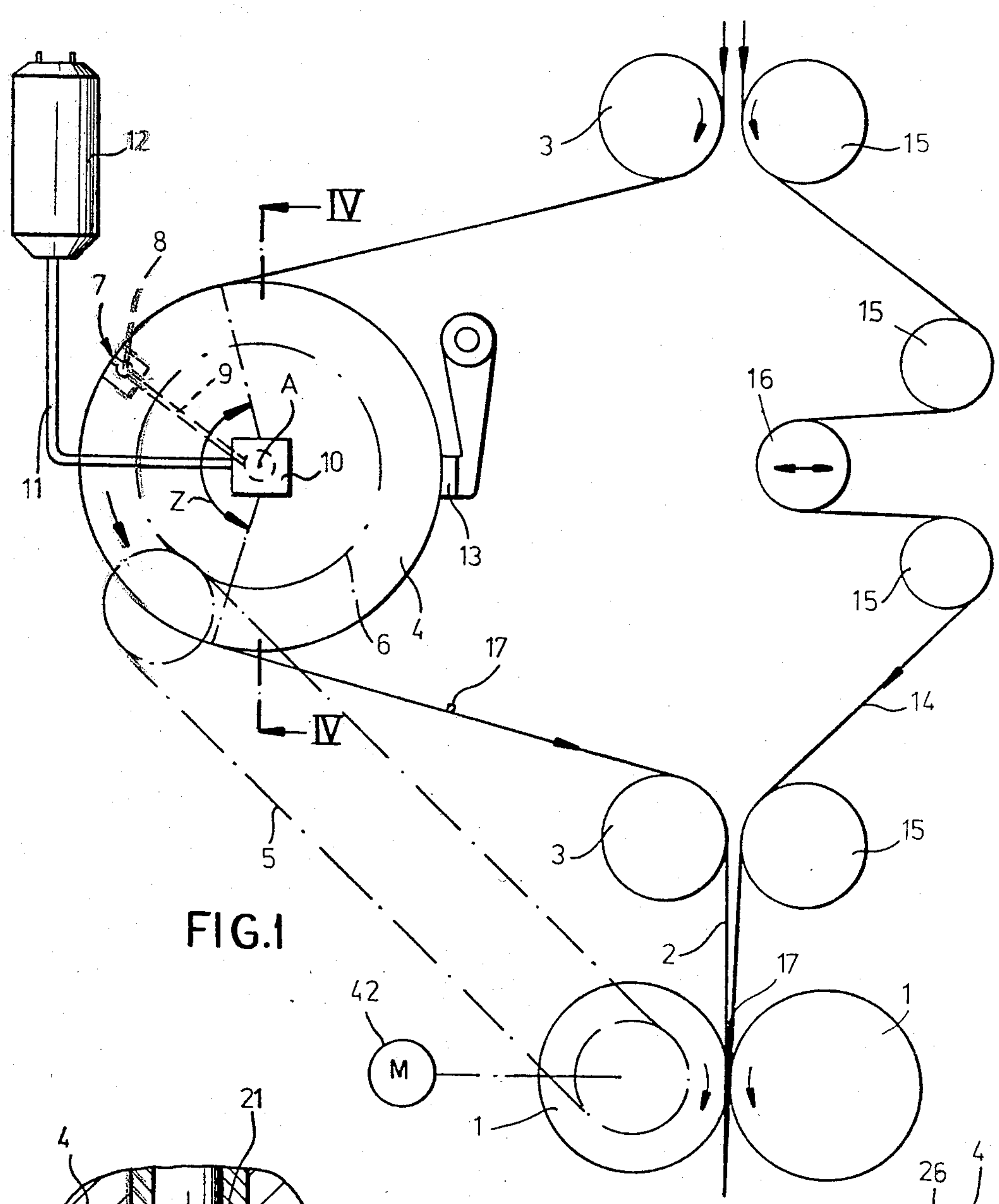
FIG. 1 is a largely diagrammatic view of a gluing apparatus according to this invention.

As seen in FIGS. 1, 3, 4, 5, 7, and 8 a striping apparatus according to the invention has a pair of upstream deflector rollers 3 and 15 over which pass a pair of similar webs 2 and 14. The web 2 then passes through a contact zone Z equal to about 135° around an applicator drum 4 described in greater detail below that forms transverse strips 17 of glue on it, then passes over another guide roller 3 to the nip between a pair of output drive pinch rolls 1. The web 14 passes over a series of rollers 15 also to the nip of the rolls 1 where it is squeezed together with the web 2 and united therewith at the glue strips 17. A deflectable roller 16 is provided between two of the rolls 15 to correct synchronization of the two webs 2 and 14, which both may be printed for later cutting up into signatures for a magazine or the like, as is well known in the art.

In this arrangement a drive 42 is connected to at least one of the pinch rolls 1 to rotate same at a peripheral speed of 300 m/min–500 m/min, which is therefore the feed rate for the webs 2 and 14. A transmission and clutch arrangement is connected to a drive gear 6 of the drum 4 for rotating same about its axis A at the same peripheral speed as the rolls 1. The circumference of the drum 4 is equal to a whole-number multiple of the spacing between adjacent strips, the multiple here being one.

Figure 3:
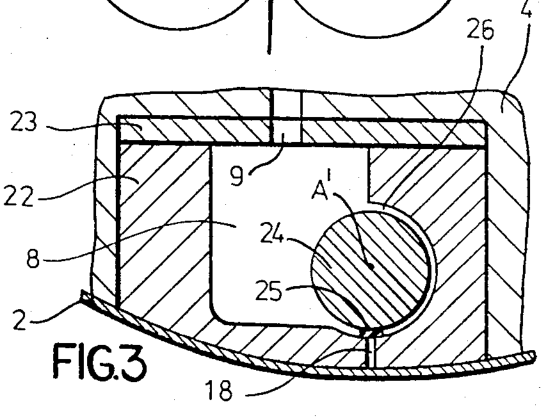
FIG. 3 is a view like FIG. 2 illustrating a detail of the FIG. 1 apparatus.
Figure 4:
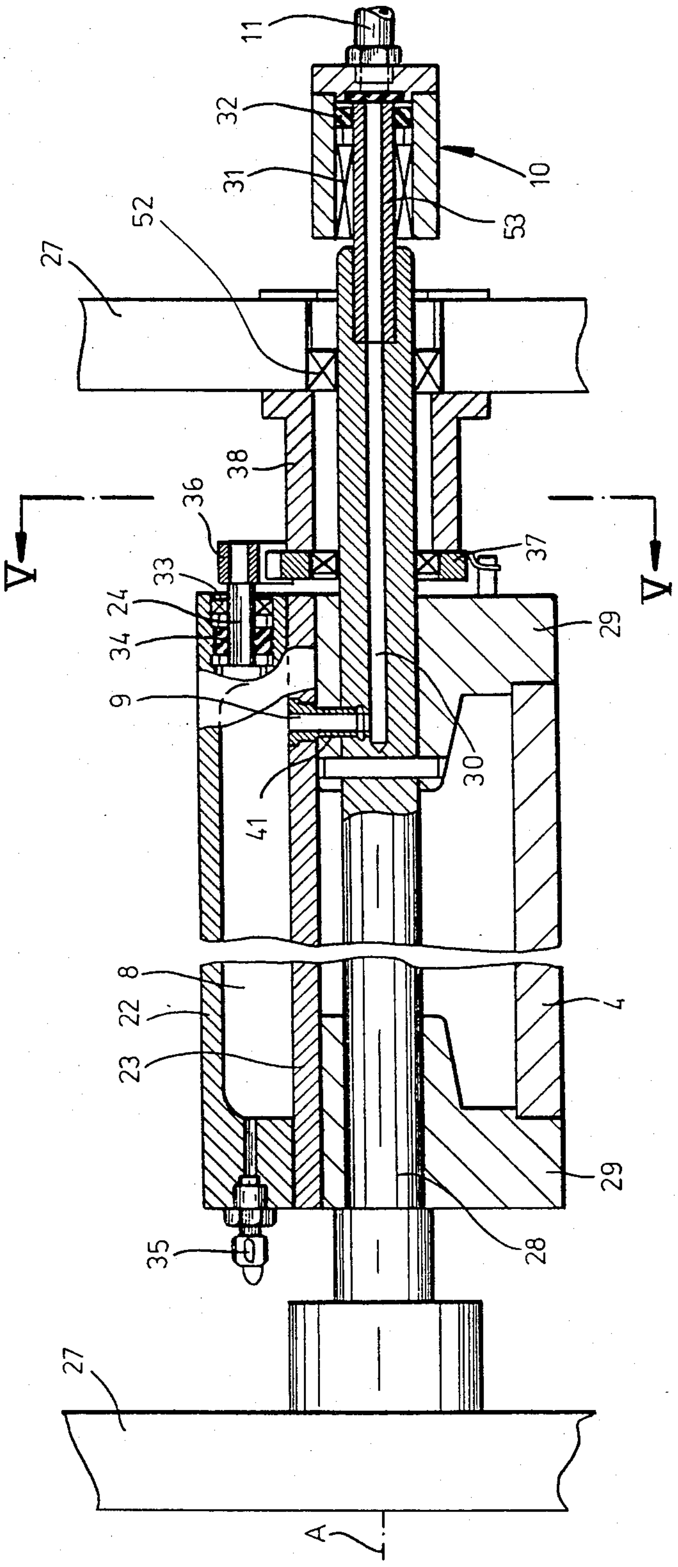
FIG. 4 is an axial section taken along line IV—IV of FIG. 1.
Figure 5:
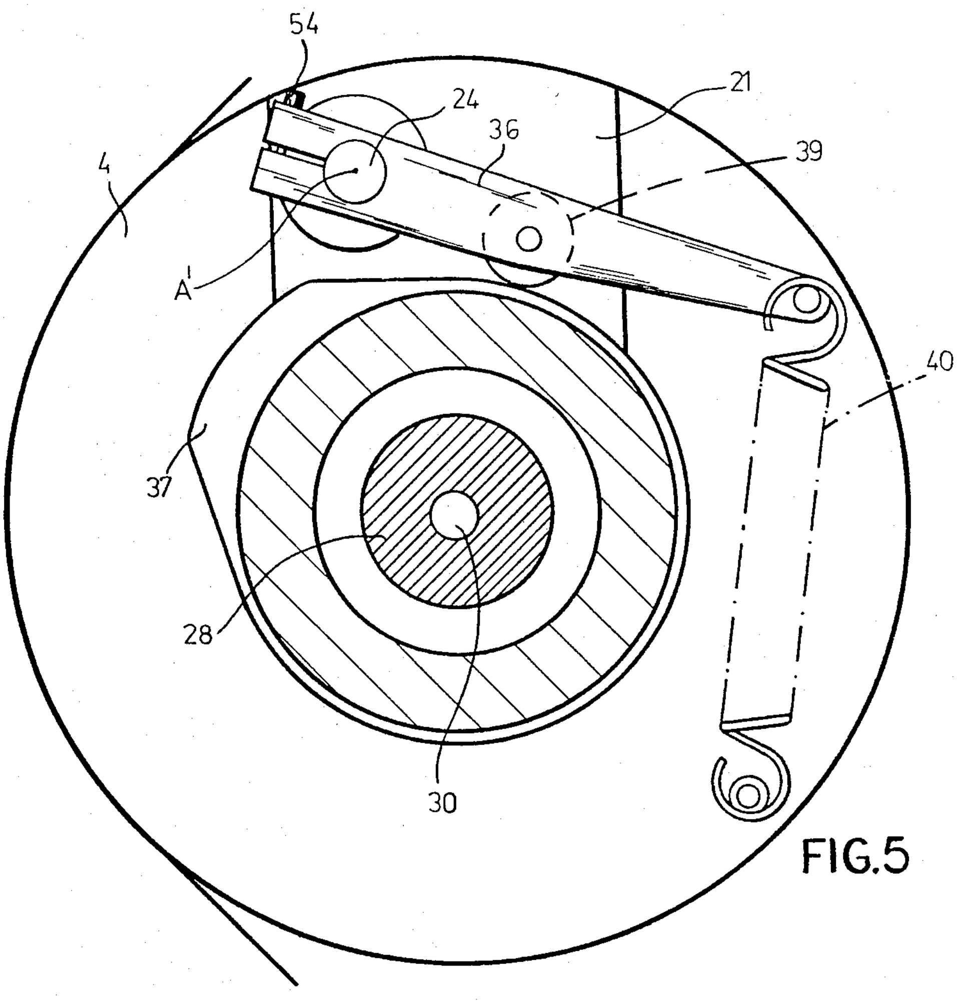
FIG. 5 is a large-scale cross section taken along line V—V of FIG. 4.

As shown in somewhat more detail in FIG. 4 the drum 4 has a pair of end flanges 29 fixed on a shaft 28 supported by bearings 52 in a stationary support 27 for rotation about the axis A. The drum 4 is provided with a removable insert 22 (FIG. 3) closed internally by a cover plate 23 and extending substantially the full axial length of the drum 4 and secured in place therein by unillustrated screws so it can be switched for different types of glue. This insert 22 forms an axially extending manifold passage 8 that opens radially outward to the exterior through an axial row 7 of identical bores 18 having a small diameter of about 0.8 mm. When the drum 4 is of a circumference equal to a whole-number multiple of the strip spacing, a corresponding number of angularly equispaced rows 7 of bores 18 are provided. One end of the passage 8 can be opened to the exterior for cleaning or other servicing via a bleed valve 35. The plate 23 has an inwardly projecting nipple 41 that forms a passage 9 that extends radially into an axial bore 30 at the center of the shaft 28.

A stationary supply 12 of liquid glue has a conduit 11 connected to a fitting that is supported via bearings 31 on a tube 53 projecting axially from one end of the rotary shaft 28. A seal 32 prevents relative leakage between the tube 53 and the conduit 11 while permitting relative rotation about the axis A. The bore 30 of the shaft 28 opens at one end into the bore of this tube 53 so that liquid glue, or any other appropriate striping liquid, can flow from the stationary supply 12 to the drum surface via the conduit 11, fitting 10, tube 53, passages 30, 9, and 8, and the bores 18.

Figure 2:
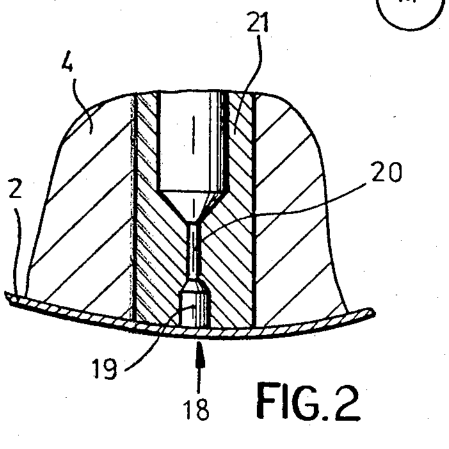
FIG. 2 is a large-scale cross section through a detail of a variation of the apparatus of FIG. 1.

These bores 18 can be formed as shown in FIG. 2 in one or more inserts 21 each having an outer portion 19 about 0.8 mm in diameter and 1 mm long and an inner portion 20 about 0.3 mm in diameter and 2 mm–4 mm long. This portion 20 will therefore create a capillary-type throttle effect that will effectively counteract the centrifugally outward force in the glue created when the drum 4 rotates.

In this FIG. 2 arrangement leakage from the row 7 or drying up of the glue at this location is inhibited when the machine is shut off by an axially extending stopper strip 13 provided diametrically opposite the center of the contact zone Z. Thus when the machine is shut down the roll 4 is disconnected at the drive 5 from the motor 42 and is rotated into position with the row 7 aligned with the stopper strip 13 which covers and closes the holes 18. Obviously several such strips 13 would be provided when there are several such rows 7.

Figure 7:
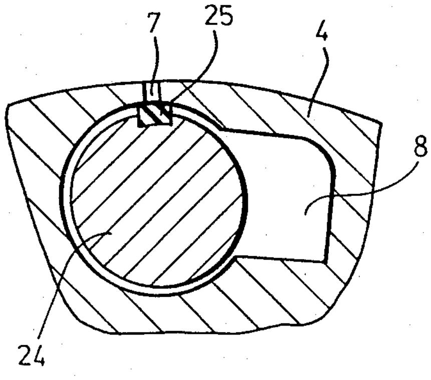
FIGS. 7 and 8 are large-scale views corresponding to details of FIG. 3 illustrating operation of the system of this invention.
Figure 8:
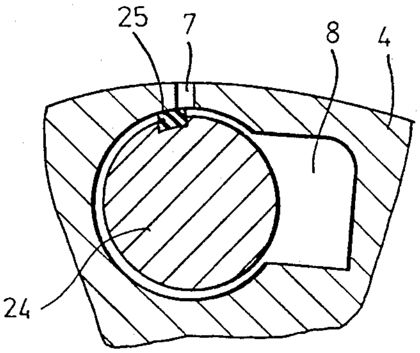

In the arrangement of FIGS. 3–5, 7, and 8, however, the passage is provided with a valve body or rod 24 centered on an axis A' which is parallel to the drum axis A. This rod 24 is cylindrical and is received with radial clearance in a semicylindrical pocket 26 at the side of the passage 8, into which pocket 26 the bores 18 open at their radial inner ends. It carries a resilient seal strip 25 which is shown in FIGS. 3 and 7 positioned over the row 7 of holes 18 and in FIG. 8 is shown angularly offset therefrom. This seal 25 can be radially displaceable in the rod 24 and urged outward by springs to press resiliently and radially outward against the inner surface of the pocket 26.

The rod 24 is carried by bearings 33 in the insert 22 for rotation about its axis A' and is provided with a seal 34 preventing leakage out of the passage 8. In addition it carries as shown in FIG. 4 at one end a lever 36 provided with a cam-follower roller 39 that rides on the periphery of a one-lobe cam 37 fixed by a sleeve 38 (FIG. 4) on the support 27. A spring 40 is hooked on the drum 4 and on the outer end of he lever 36 to urge the roller 39 against the cam 37. The profile of the cam 37 is such that each time the row 7 is in the zone Z (FIG. 1) the strip 25 is moved from the closed position of FIGS. 3 and 7 to the open position of FIG. 8, thereby allowing a small amount of the glue in the passage 8 to flow out the row 7 of holes 18 to form a glue strip 17 on the web 2.

Of course if the drum 4 has several such rows 7 of holes 18, the cam 37 is correspondingly formed with several lobes. Alternately the cam 37 can have cutouts into which the follower 39 drops to open the bores.

In addition a bolt 54 that secures the lever 36 to the rod 24 can be loosened to change the relative angular positions of these elements. This allows the dosing or metering of the glue to be controlled accurately, with the seal 25 moving at most into a position only partly unblocking the row 7 as shown in FIG. 8 for minimal flow.

Figure 6:
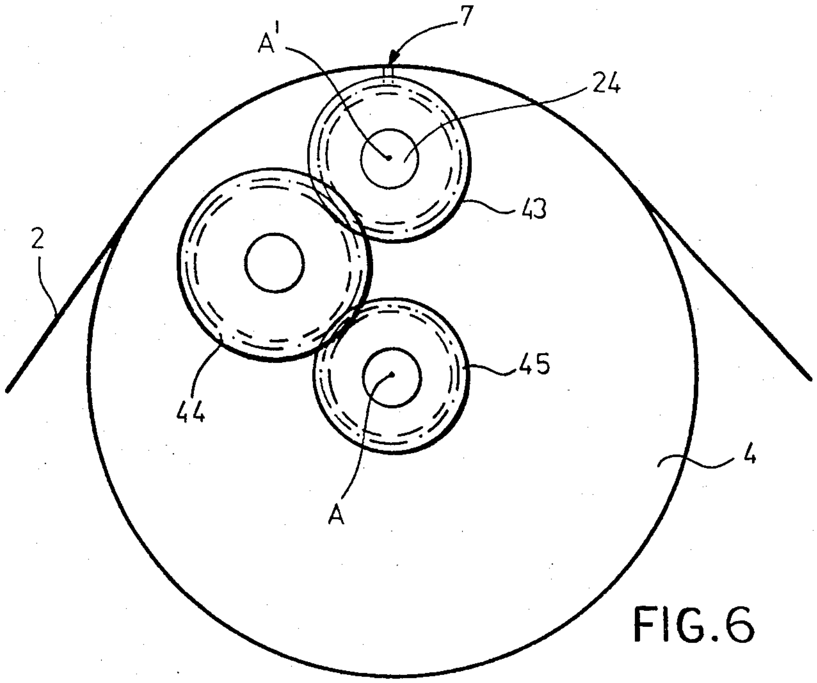
FIG. 6 is a view like FIG. 5 of another variant according to this invention.

It is also possible as shown in FIG. 6 to provide the end of the rod 24 with a gear 43 that meshes with a gear 44 carried on the drum 4 and that in turn meshes with a stationary gear 45 centered on the axis A. In this arrangement the seal strip 25 extends angularly almost all the way around the rod 24 and leaves a gap, or several angularly equispaced gaps in an arrangement with several bore rows 7, that is aligned with the row 7 once during each revolution. This wholly rotary system operates very smoothly, with the rotation direction of the rod 24 being opposite that of the drum 4.

Figure 9:
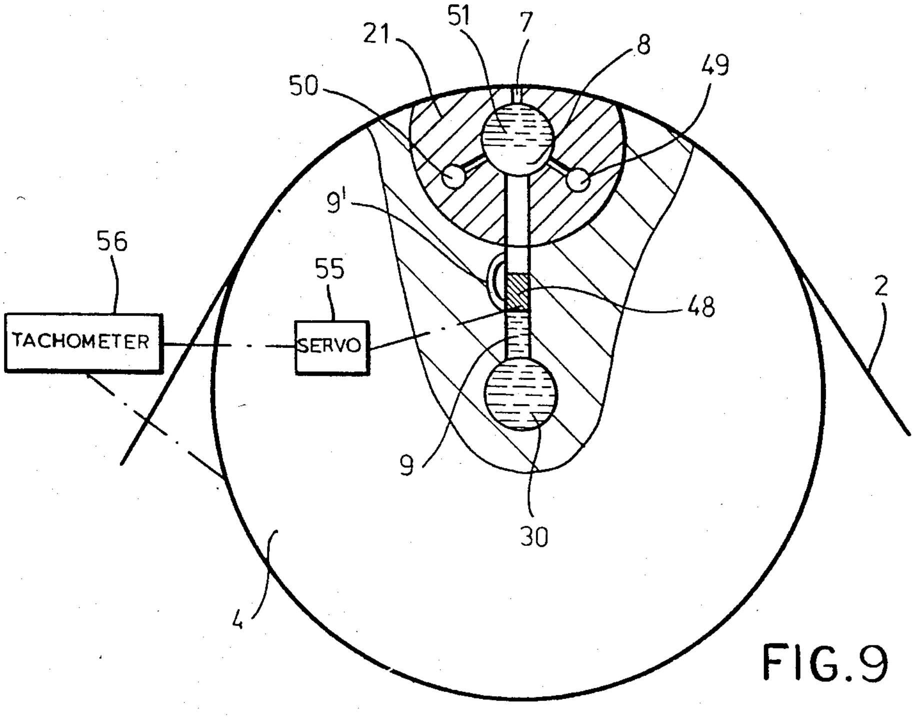
FIG. 9 is a partly sectional view like FIG. 6 through a further variant according to this invention.

Another system is shown in FIG. 9 wherein the passage 9 is provided with a valve body 47 that can block off a shunt passage 9' to control the depth of a body 51 of liquid glue in the passage 8. The depth of the body 51 determines the centrifugal force and pressure. The position of the valve body 48 is controlled by a standard servomechanism 55 controlled in turn by a tachometer 56 that ascertains drum rotation speed. In addition a source of air or liquid under pressure can be connected to a passage 49 opening into the passage 8, and a suction source to a similar such passage 50 for extremely fine flow control, also under the control of the tachometer 56.

With this system of FIG. 9, therefore, it is possible to operate the drum 4 at different speeds. Once properly set for the bore diameter and glue viscosity the machine will adjust glue pressure for perfect flow at any rotation speed, and will even adjust it continuously with varying rotation speed.

The system according to this invention forms accurate and neat strips 17 on the web 2 even while same is moving very rapidly. The drum 4 does not stream glue when not in contact with the web 4 because of the throttling effect of the passages or the valve arrangements. It therefore allows glue-striping to be used even in a very high speed modern binding system, forming at very high speed glued signatures readily reduced to books, magazines, or the like.

What is claimed is:

1. An apparatus for forming a succession of equispaced and transversely extending glue strips on a longitudinally extending web, the apparatus comprising:

an applicator drum rotatable about a drum axis and having a cylindrical outer surface with a circumference equal to a whole-number multiple of the desired distance between succeeding strips, the drum being formed with at least one axially extending manifold passage and an axially extending row of bores opening radially outward at the drum surface and inward into the passage;

guide and transport means for displacing the web longitudinally at very high speed past the applicator drum with the web looped over same and engaging same over an angularly extending contact region of at least 90° relative to the axis;

drive means for rotating the drum about the axis synchronously with the web at a peripheral speed substantially equal to the very high displacement speed of the web;

a stationary supply of liquid glue suitable for forming the strips; and conduit means connected between the supply and the manifold passage for conducting the glue from the supply to the bores and thence to the surface of the drum along the row of bores, whereby the glue emerging from the bores is applied as the strip to the passing web.

2. The gluing apparatus defined in claim 1 wherein the bores are of such a flow cross section, relative to the rotation speed of the drum and viscosity of the glue, that they substantially counteract the radially outwardly directed force effective on the glue in the bores and passage due to drum rotation.

3. The gluing apparatus defined in claim 2 wherein each bore has a radially outer portion of a length of about 1 mm and a diameter of about 0.8 mm and an inner portion of a length of about between 2 mm and 4 mm and a diameter of about 0.3 mm.

4. The gluing apparatus defined in claim 1 wherein the drum is provided with at least one removable insert formed with at least one of the bores.

5. The gluing apparatus defined in claim 1, further comprising valve means including a valve body at the inner ends of the bores displaceable between an open position permitting flow into and along the bores and a closed position preventing such flow.

6. The gluing apparatus defined in claim 5 wherein the valve body extends axially in the passage and is movable therein about a valve axis offset from the drum axis.

7. The gluing apparatus defined in claim 6 wherein the valve body fits with radial play relative to the valve axis in the passage and is provided with a resilient seal ridge overlying the inner bore ends in the closed position and spaced therefrom in the open position.

8. The gluing apparatus defined in claim 7 wherein the drum is provided with a removable insert forming the manifold passage and bores and housing the valve body.

9. The gluing apparatus defined in claim 6 wherein the valve means includes actuation means for displacing the valve body between its open and closed positions synchronously with each revolution of the drum about the drum axis a number of times equal to the number of rows of bores on the drum.

10. The gluing apparatus defined in claim 9 wherein the actuation means includes a stationary cam adjacent the drum and a cam follower carried on the drum, connected to the valve body, and engaging the cam.

11. The gluing apparatus defined in claim 9 wherein the actuation means includes a stationary gear adjacent the drum and a gear train meshing with the gear and connected to the cam for rotation of the valve body synchronously with the drum.

12. The gluing apparatus defined in claim 9, further comprising means for varying the angle through which the actuation means displaces the valve body, whereby flow control is achieved.

13. The gluing apparatus defined in claim 6 wherein the valve axis is displaceable relative to the bores for adjustment of the clearance between the valve body and the inner bore ends.

14. The gluing apparatus defined in claim 1, further comprising means connected to the conduit means and responsive to drum rotation rate for metering the glue to the bores.

15. The gluing apparatus defined in claim 14 wherein the metering means includes a valve in the drum between the conduit means and the passage.

16. The gluing apparatus defined in claim 14 wherein the metering means includes a throttle.

17. The gluing apparatus defined in claim 14 wherein the metering means includes means for subjecting the passage to a pressure other than ambient.

18. The gluing apparatus defined in claim 1, further comprising cover means engageable with the outer ends of the bores to seal same in a position offset from the region of contact between the web and the drum surface.

19. The gluing apparatus defined in claim 1, further comprising second guide and drive means for feeding a second web separate from the first-mentioned web at the very high speed past the drum to a uniting location downstream of the drum; and a pair of pinch rolls at the uniting location rotating at the same peripheral speed as the drum and gripping the two webs, whereby the webs are glued together along lines defined by the glue strips.

20. An apparatus for forming a succession of equispaced and transversely extending glue strips on a longitudinally extending web, the apparatus comprising:

an applicator drum rotatable about a drum axis and having a cylindrical outer surface with a circumference equal to a whole-number multiple of the desired distance between succeeding strips, the drum being formed with at least one axially extending manifold passage and an axially extending row of bores opening radially outward at the drum surface and inward into the passage;

guide and transport means for displacing the web longitudinally at very high speed past the applicator drum with the web looped over same and engaging same over an angularly extending contact region of at least 90° relative to the axis;

drive means for rotating the drum about the axis synchronously with the web at a peripheral speed substantially equal to the very high displacement speed of the web;

a stationary supply of liquid glue suitable for forming the strips;

conduit means connected between the supply and the manifold passage for conducting the glue from the supply to the passage;

a valve body in the passage pivotally displaceable between a position blocking the bores and a position clear of the bores, whereby in the blocking position the glue cannot flow from the passage into the bores and thence to the surface of the drum; and actuation means for pivoting the valve body between its positions synchronously with each revolution of the drum about the drum axis a number of times equal to the number of rows of bores on the drum.

* * * * *